(12) United States Patent
Sheidler et al.

(10) Patent No.: US 11,339,750 B2
(45) Date of Patent: May 24, 2022

(54) COMBUSTION AIR FILTRATION APPARATUS

(71) Applicant: DEERE & COMPANY, Moline, IL (US)

(72) Inventors: Alan D. Sheidler, Moline, IL (US); Cory Conner, Davenport, IA (US); Gary H. Knapp, Coal Valley, IL (US)

(73) Assignee: Deere & Company, Moline, IL (US)

( * ) Notice: Subject to any disclaimer, the term of this patent is extended or adjusted under 35 U.S.C. 154(b) by 160 days.

(21) Appl. No.: 16/861,260

(22) Filed: Apr. 29, 2020

(65) Prior Publication Data
US 2021/0340939 A1  Nov. 4, 2021

(51) Int. Cl.
| | |
|---|---|
| *F02M 35/02* | (2006.01) |
| *F02M 35/024* | (2006.01) |
| *F02M 35/16* | (2006.01) |
| *F02M 35/04* | (2006.01) |
| *F02M 35/08* | (2006.01) |

(52) U.S. Cl.
CPC .. *F02M 35/0215* (2013.01); *F02M 35/02491* (2013.01); *F02M 35/042* (2013.01); *F02M 35/164* (2013.01); *F02M 35/08* (2013.01)

(58) Field of Classification Search
CPC ......... F02M 35/0215; F02M 35/02491; F02M 35/042; F02M 35/164; F02M 35/08
See application file for complete search history.

(56) References Cited

U.S. PATENT DOCUMENTS

| | | |
|---|---|---|
| 5,085,049 A | 2/1992 | Rim et al. |
| 6,892,531 B2 | 5/2005 | Rim |
| 7,261,068 B1 | 8/2007 | Wantschik |
| 2004/0065195 A1 | 4/2004 | Gogins |
| 2004/0093859 A1 | 5/2004 | Schmeichel et al. |
| 2004/0187689 A1 | 9/2004 | Sporre et al. |
| 2004/0255783 A1 | 12/2004 | Graham et al. |
| 2005/0120881 A1 | 6/2005 | Sporre et al. |
| 2005/0191169 A1 | 9/2005 | Cuvelier et al. |

(Continued)

FOREIGN PATENT DOCUMENTS

| | | |
|---|---|---|
| EP | 0930422 A1 | 7/1999 |
| IN | 4710/DELNP/2007 A | 8/2007 |

(Continued)

OTHER PUBLICATIONS

Brochure titled "Donaldson Self-Cleaning Air Cleaner" (4 pages) (2017).

*Primary Examiner* — Jacob M Amick
*Assistant Examiner* — Charles J Brauch

(57) ABSTRACT

A combustion air filtration apparatus for filtering combustion air for an engine is disclosed. The combustion air filtration apparatus comprises a combustion air source and a filter system fluidly coupled to the combustion air source and to the engine to receive combustion air from the combustion air source and to supply filtered combustion air for the engine. The filter system comprises a first combustion air filter, a second combustion air filter flow-parallel to the first combustion air filter, and a flow control system fluidly coupled to the first combustion air filter and the second combustion air filter to direct flow of combustion air selectively between the first combustion air filter and the second combustion air filter.

15 Claims, 5 Drawing Sheets

(56) References Cited

U.S. PATENT DOCUMENTS

| | | |
|---|---|---|
| 2006/0096263 A1 | 5/2006 | Kahlbaugh et al. |
| 2006/0191249 A1 | 8/2006 | Gogins et al. |
| 2006/0201326 A1 | 9/2006 | Wagner et al. |
| 2006/0225993 A1 | 10/2006 | Heuthorst et al. |
| 2008/0035103 A1 | 2/2008 | Barris et al. |
| 2008/0086989 A1* | 4/2008 | Sheidler ............... F02M 35/022 55/345 |
| 2008/0127825 A1 | 6/2008 | Raether |
| 2008/0127826 A1 | 6/2008 | Raether |
| 2008/0127827 A1 | 6/2008 | Raether |
| 2008/0178413 A1 | 7/2008 | Wagner et al. |
| 2009/0113856 A1* | 5/2009 | Cooper ................ E01H 1/0872 55/283 |
| 2009/0205445 A1 | 8/2009 | Raether |
| 2009/0308034 A1 | 12/2009 | Olson et al. |
| 2010/0031616 A1 | 2/2010 | Gillingham et al. |
| 2010/0233048 A1 | 9/2010 | Dallas et al. |
| 2010/0263337 A1 | 10/2010 | Raether et al. |
| 2010/0326024 A1 | 12/2010 | Vanderlinden et al. |
| 2011/0041692 A1 | 2/2011 | Raether |
| 2011/0048228 A1 | 3/2011 | Handley et al. |
| 2011/0072972 A1 | 3/2011 | Raether et al. |
| 2011/0078985 A1 | 4/2011 | Belcher et al. |
| 2011/0083408 A1 | 4/2011 | Raether et al. |
| 2011/0113736 A1 | 5/2011 | Raether et al. |
| 2011/0185689 A1 | 8/2011 | Raether et al. |
| 2011/0252964 A1 | 10/2011 | Wahlquist et al. |
| 2012/0011815 A1 | 1/2012 | Raether et al. |
| 2013/0305667 A1 | 11/2013 | Raether |
| 2013/0305926 A1 | 11/2013 | Raether |
| 2014/0123621 A1 | 5/2014 | Driessens et al. |
| 2014/0238240 A1 | 8/2014 | Raether |
| 2014/0245704 A1 | 9/2014 | Raether |
| 2014/0251143 A1 | 9/2014 | Hawkinson et al. |
| 2017/0252691 A1 | 9/2017 | Johnson et al. |
| 2018/0056226 A1 | 3/2018 | Buettner, III et al. |
| 2019/0255473 A1 | 8/2019 | Gao et al. |

FOREIGN PATENT DOCUMENTS

| | | |
|---|---|---|
| JP | H08232637 A | 9/1996 |
| WO | WO2014065819 A1 | 5/2014 |
| WO | WO2019118744 A1 | 6/2019 |
| WO | WO2019143704 A1 | 7/2019 |
| WO | WO2019147704 A1 | 8/2019 |
| WO | WO2020086695 A1 | 4/2020 |
| WO | WO2020131926 A1 | 6/2020 |

\* cited by examiner

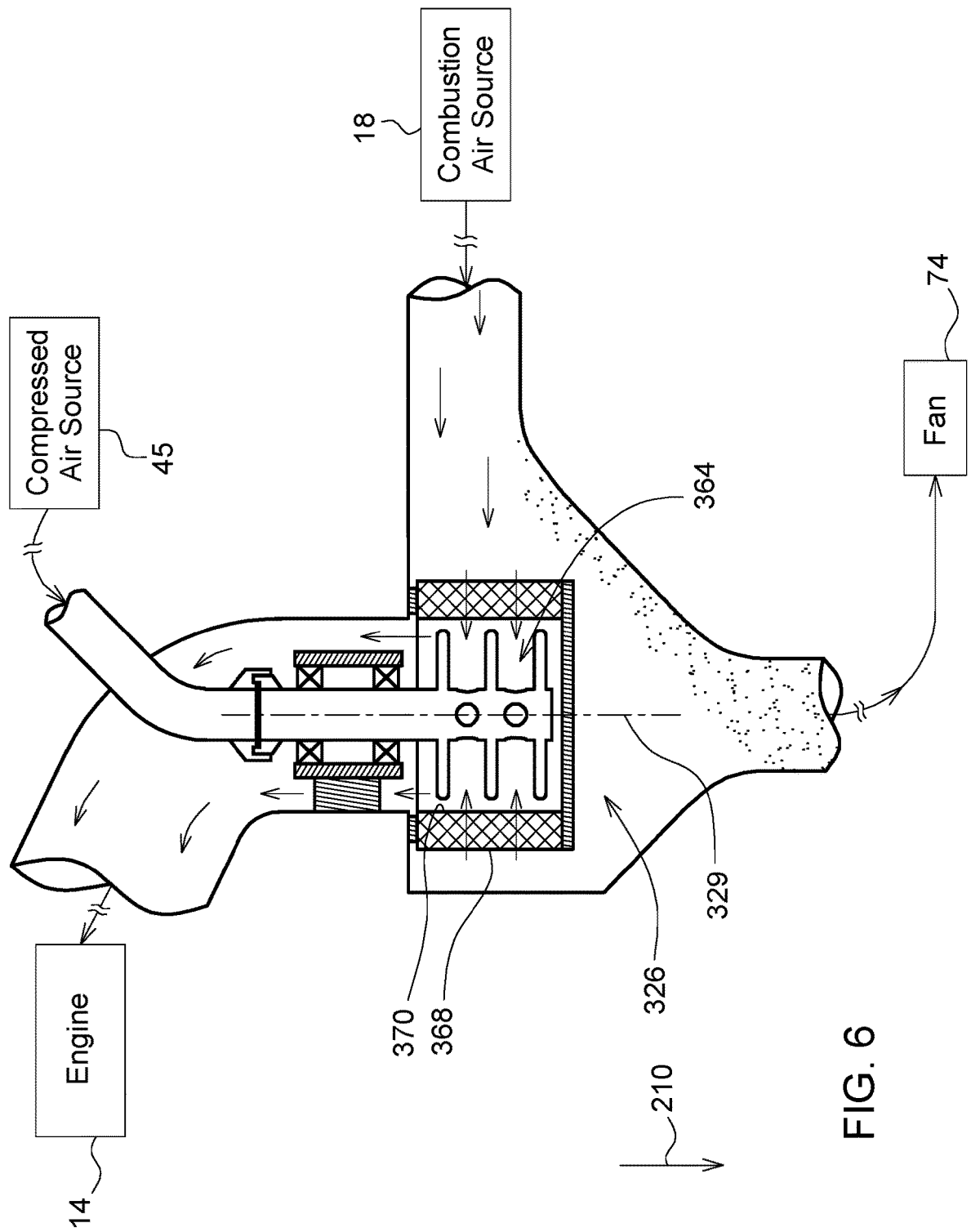

COMBUSTION AIR FILTRATION APPARATUS

FIELD OF THE DISCLOSURE

The present disclosure relates to filtration of combustion air, and, more particularly, to an apparatus to provide such filtration.

BACKGROUND OF THE DISCLOSURE

Combine harvesters often operate in an environment with debris in the ambient air. The debris may take the form of dust, crop residue discharged from the combine harvester, or other particles. Combustion air sourced from ambient air is filtered of debris prior to admission into the engine of the combine harvester.

SUMMARY OF THE DISCLOSURE

According to an aspect of the present disclosure, a combustion air filtration apparatus for filtering combustion air for an engine comprises a combustion air source and a filter system fluidly coupled to the combustion air source and to the engine to receive combustion air from the combustion air source and to supply filtered combustion air for the engine. The filter system comprises a first combustion air filter, a second combustion air filter flow-parallel to the first combustion air filter, and a flow control system fluidly coupled to the first combustion air filter and the second combustion air filter to direct flow of combustion air selectively between the first combustion air filter and the second combustion air filter.

The above and other features will become apparent from the following description and accompanying drawings.

BRIEF DESCRIPTION OF THE DRAWINGS

The detailed description of the drawings refers to the accompanying figures in which:

FIG. 6 is a partially diagrammatic, elevational view showing another cylindrical combustion air filter embodiment oriented with a vertical axis.

DETAILED DESCRIPTION OF THE DRAWINGS

Figure 1:
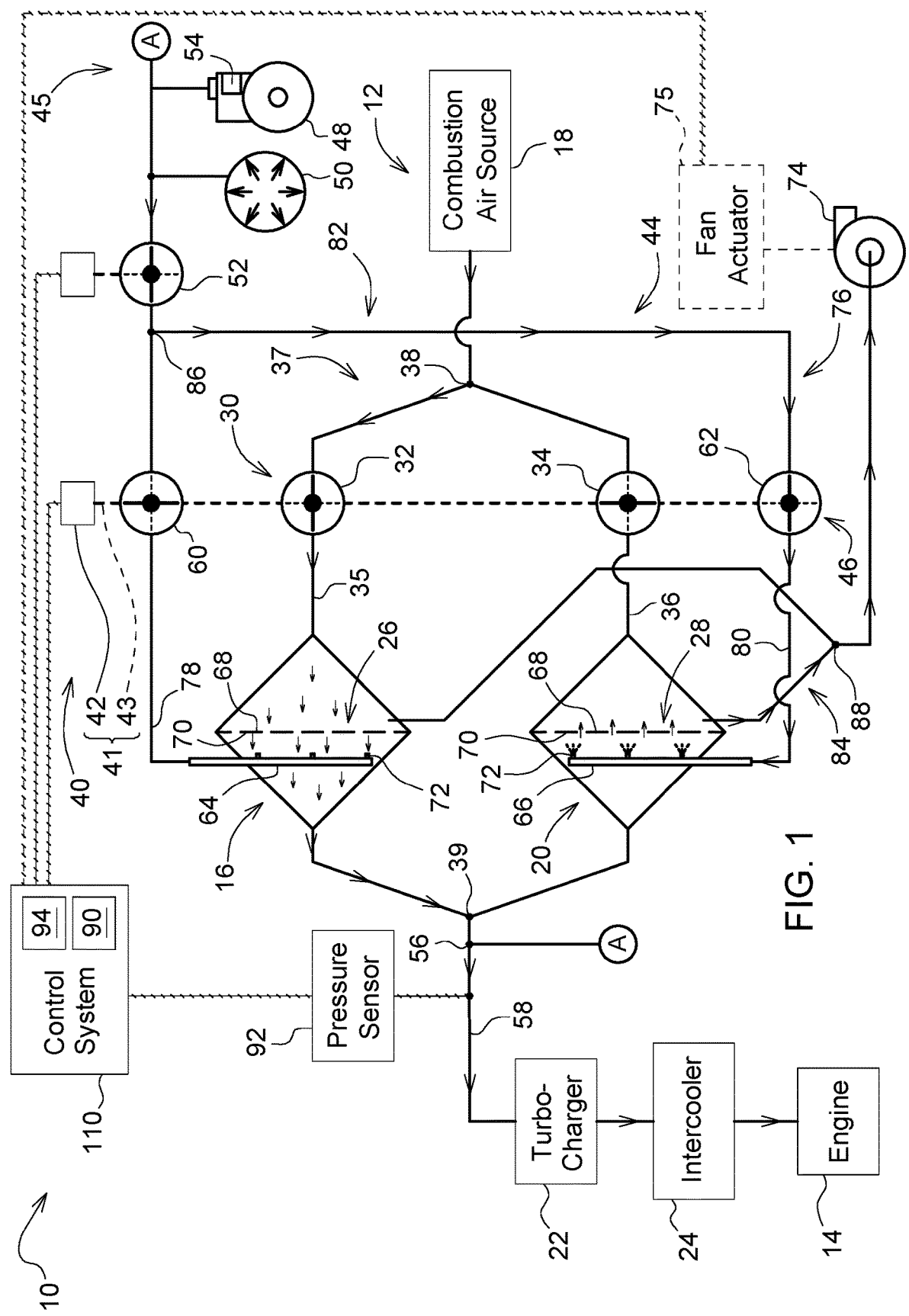
FIG. 1 is a diagrammatic view showing a machine with a combustion air filtration apparatus for filtering combustion air and cleaning associated combustion air filters.

Referring to FIG. 1, a machine 10 includes a combustion air supply circuit 12 to supply combustion air to an engine 14 of the machine 10. The supply circuit 12 includes a combustion air filtration apparatus 16 for filtering combustion air for the engine 14. The filtration apparatus 16 is designed to maximize the amount of time until filter servicing may be needed. The machine 10 may be any of a wide variety of different types of machines. In some embodiments, the machine 10 may be an agricultural, construction, or forestry vehicle. In some embodiments, the machine 10 may be a combine harvester, in which case the filtration apparatus 16 may help to reduce machine downtime for filter servicing during harvest season, or possibly even avoid such downtime altogether until after harvest completion in some situations.

The supply circuit 12 includes a combustion air source 18 and a filter system 20. The combustion air source provides combustion air for the engine 14 via the filter system 20. The combustion air source 18 may include a combustion air inlet where combustion air enters the machine 10. The source 18 may further include a rotary screen positioned at the combustion air inlet to filter larger debris and a cyclonic pre-cleaner downstream of the rotary screen to filter the combustion air further.

The supply circuit 12 may include a turbocharger 22 and an intercooler 24. In such a case, the turbocharger 22 is positioned downstream of the filter system 20 to compress the filtered combustion air prior to admission into the engine 14. The intercooler 24 is positioned downstream of the turbocharger 22 to cool the compressed combustion air prior to admission into the engine 14. In some embodiments, the engine 14 may be naturally aspirated, without the turbocharger 22 and intercooler 24.

The filter system 20 includes a first combustion air filter 26 and a second combustion air filter 28. The first and second filters 26, 28 are flow-parallel to one another. In some embodiments, the filter system 20 has more than two combustion air filters flow-parallel to one another.

The filter system 20 includes a flow control system 30. The flow control system 30 is fluidly coupled to the first filter 26 and the second filter 28 to direct flow of combustion air selectively between the first filter 26 and the second filter 28. Illustratively, the flow control system 30 comprises a first combustion air valve 32 fluidly coupled to the first filter 26 to control flow of combustion air to the first filter 26 and a second combustion air valve 34 flow-parallel to the first combustion air valve 32 and fluidly coupled to the second filter 28 to control flow of combustion air to the second filter 28. Each valve 32, 34 may be configured, for example, as a butterfly valve for use with relatively low pressures. In some embodiments, the flow control system 30 may include a single diverter valve, instead of the two combustion air valves 32, 34, to direct flow of combustion air selectively between the first and second filters 26, 28.

The filter system 20 includes a first branch 35 and a second branch 36 flow-parallel to the first branch 35. The first branch 35 includes the first combustion air filter 26 and the first combustion air valve 32. The second branch 36 includes the second combustion air filter 28 and the second combustion air valve 34. The first and second branches 35, 36 cooperate to provide a first flow-parallel arrangement 37 and join together at an upstream node 38 of the arrangement 37 upstream of the valves 32, 34 and a downstream node 39 of the arrangement 37 downstream of the filters 26, 28.

The filtration apparatus 16 includes an actuation system 40. The actuation system 40 is operatively coupled to the first combustion air valve 32 and the second combustion air valve 34 to move the first combustion air valve 32 between opened and closed positions and the second combustion air valve 34 between opened and closed positions in a manner opposite to the first combustion air valve 32. Each valve 32, 34 is thus operable between its opened and closed positions. When the first combustion air valve 32 is in the opened position, the second combustion air valve 34 is in the closed position. When the second combustion air valve 34 is in the opened position, the first combustion air valve 32 is in the closed position. The opened position allows flow of combustion air to the respective filter 26, 28 for filtering thereby making that filter 26, 28 "active," or an "active filter," with respect to filtering combustion air, whereas the closed position blocks flow of combustion air to the respective filter 26, 28 making that filter 26, 28 "inactive," or an "inactive filter," with respect to filtering combustion air.

The actuation system 40 may include, for example, a single actuator 41 having a motor 42 and a shaft 43 driven by the motor 42 and operatively coupled to the first combustion air valve 32 and the second combustion air valve 34. If the valves 32, 34 are butterfly valves, the valves 32, 34 may be mounted on the shaft 43 such that the shaft 43 extends coaxially through the valves 32, 34. Rotation of the shaft 43 in opposite directions rotates the valves 32, 34 between their corresponding opened and closed positions. The motor 42 may be an electric motor, or other suitable motor to rotate the shaft 42. A single actuator 41 with a shaft 43 extending through the valves 32, 34 provides an efficient and effective way of actuating the valves 32, 34.

It is to be appreciated that other actuation systems may be employed to actuate the valves 32, 34. In some embodiments, there may be a complex linkage for actuating the valves 32, 34 in a single stroke. In some embodiments, the axis of rotation of one or more of the valves 32, 34 may be transverse to the axis of rotation of the shaft 43, in which case rotation of the shaft 43 may be transmitted to the respective valve 32, 34 via a bevel gear arrangement including, for example, a bevel gear on the shaft 43 and a mating bevel gear on a shaft of the respective valve 32, 34. In some embodiments, there may be an actuator for each valve 32, 34, such as, for example, a motor and corresponding shaft to drive the respective valve 32, 34. The valves 32, 34 may be actuated in a wide variety of ways.

The filtration apparatus 16 includes a filter cleaning system 44. The filter cleaning system 44 is fluidly coupled to the filter system 20 to clean the first combustion air filter 26 and the second combustion air filter 28 selectively. The filter cleaning system 44 is configured to clean the filters 26, 28 when they are inactive.

The filter cleaning system 44 includes, for example, a compressed air source 45 and a second flow control system 46. The second flow control system 46 is positioned fluidly between the compressed air source 45 and the first and second combustion air filters 26, 28 such that the second flow control system 46 is fluidly coupled to the compressed air source 45 and the first and second combustion air filters 26, 28. The second flow control system 46 is operable to direct flow of compressed air supplied by the compressed air source 45 selectively between the first combustion air filter 26 and the second combustion air filter 28.

The compressed air source 45 may be configured in a wide variety of ways. Illustratively, the compressed air source 45 includes an air compressor 48, a compressed air storage tank 50, and a purge valve 52. The air compressor 48 supplies compressed air to the storage tank 50. The purge valve 52 is operable between a closed position and an opened position. The purge valve 52 blocks release of compressed air from the storage tank 50 to the second flow control system 46 when the purge valve 52 is in the closed position, and allows release of compressed air from the storage tank 50 to the second flow control system 46 when the purge valve 52 is in the opened position. The compressor 48 may be configured, for example, as a piston-type air compressor, or in a wide variety of other ways. The purge valve 52 may be configured, for example, as a solenoid purge valve, or in a wide variety of other ways.

The filtration apparatus 16 may be configured such that the compressed air source 45 is supplied with filtered combustion air from a point downstream of the first and second combustion air filters 26, 28. Illustratively, the compressed air source 45 has an air inlet 54 fluidly coupled to a point 56 in a combustion air line 58 downstream of the first combustion air filter 26 and the second combustion air filter 28. In some embodiments, the compressed air source 45 may receive air from other sources, such as directly from atmosphere.

The second flow control system 46 includes, for example, a first compressed air valve 60 and a second compressed air valve 62. The first compressed air valve 60 is fluidly coupled to the first combustion air filter 26 to control flow of compressed air thereto. The second compressed air valve 62 is flow-parallel to the first compressed air valve 60 and is fluidly coupled to the second combustion air filter 28 to control flow of compressed air thereto. Each valve 60, 62 may be configured, for example, as a butterfly valve capable of handling relatively high pressures. In some embodiments, the second flow control system 46 may include a single diverter valve, instead of the two compressed air valves 60, 62, to direct flow of compressed air selectively between the first and second filters 26, 28.

The second flow control system 46 includes a first dispenser 64 and a second dispenser 66. The first dispenser 64 is fluidly coupled to the first compressed air valve 60 and is positioned in proximity to the first combustion air filter 26 to dispense compressed air thereto. The second dispenser 66 is fluidly coupled to the second compressed air valve 62 and is positioned in proximity to the second combustion air filter 28 to dispense compressed air thereto.

Each of the combustion air filters 26, 28 has a first side 68 and a second side 70 opposite to the first side 68. The first combustion air valve 32 is fluidly coupled to the first side 68 of the first combustion air filter 26. The first compressed air valve 60 is fluidly coupled to the second side 70 of the first combustion air filter 26 via the first dispenser 64. The second combustion air valve 34 is fluidly coupled to the first side 68 of the second combustion air filter 28. The second compressed air valve 62 is fluidly coupled to the second side 70 of the second combustion air valve 34. Each of the dispensers 64, 66 has a number of nozzles 72 positioned in proximity to the second side 70 of the respective combustion air filter 26, 28 to dispense compressed air thereto. With respect to each of the combustion air filters 26, 28, combustion air flows from the first side 68 to the second side 70, and compressed air flows from the second side 70 to the first side 68.

The filter cleaning system 44 includes a vacuum fan 74. The fan 74 is fluidly coupled to the combustion air filters 26, 28 to remove debris released therefrom due to application of compressed air by the filter cleaning system 44. The fan 74 is fluidly coupled to the first side 68 of the first combustion air filter 26 and the first side 68 of the second combustion air filter 28 to remove debris released from the filters 26, 28. The debris may then be discharged externally from the machine 10 by the fan 74. In some embodiments, the fan 74 runs with the engine 14. In such a case, the fan 74 is driven by the engine 14 so as to operate continuously with the engine 14. In other embodiments, the fan 74 may operate intermittently so as to be turned ON and OFF as needed during operation of the engine 14. In such a case, a fan actuator 75, such as an electric motor, may be drivingly coupled to the fan 74 to turn the fan 74 ON and OFF.

The filter cleaning system 44 includes a second flow-parallel arrangement 76. The second flow-parallel arrangement 76 includes a first branch 78 and a second branch 80 flow-parallel to the first branch 78. The first branch 78 includes the first compressed air valve 60 and the first dispenser 64. The second branch 80 includes the second compressed air valve 62 and the second dispenser 66. The first and second branches 78, 80 cooperate to provide the second flow-parallel arrangement 76 with an upstream portion 82 upstream of the filters 26, 28 and a downstream portion 84 downstream of the filters 26, 28. The upstream portion 82 of the first and second branches 78, 80 join together at an upstream node 86 of the arrangement 76 upstream of the compressed air valves 60, 62, the dispensers 64, 66, and the filters 26, 28. The downstream portion 84 of the first and second branches 78, 80 join together at a downstream node 88 of the arrangement 76 downstream of the filters 26, 28.

The actuation system 40 is operatively coupled to the first compressed air valve 60 and the second compressed air valve 62 to move the first compressed air valve 60 between opened and closed positions and the second compressed air valve 62 between opened and closed positions in a manner opposite to the first compressed air valve 60. When the first compressed air valve 60 is in the opened position, the second compressed air valve 62 is in the closed position. When the second compressed air valve 62 is in the opened position, the first compressed air valve 64 is in the closed position. The opened position allows flow of compressed air to the respective filter 26, 28 for removal of debris therefrom when that filter 26, 28 is inactive, whereas the closed position blocks flow of compressed air to the respective filter 26, 28 when that filter 26, 28 is active. Each valve 60, 62 is thus operable between its opened and closed positions.

The combustion air valves 32, 34 and the compressed air valves 60, 62 are operable in a first mode of operation and a second mode of operation. In the first mode of operation (solids lines of valves 32, 34, 60, 62), the first combustion air valve 32 is in its opened position allowing flow of combustion air to the first side 68 of the first combustion air filter 26 for filtering of combustion air by the first combustion air filter 26; the second combustion air valve 34 is in its closed position blocking flow of combustion air to the second combustion air filter 28; the first compressed air valve 60 is in its closed position blocking flow of compressed air to the first combustion air filter 26; and the second compressed air valve 62 is in its opened position allowing flow of compressed air to the second side 70 of the second combustion air filter 28 for cleaning of the second combustion air filter 28. In the second mode of operation (dashed lines of valves 32, 34, 60, 62), the first combustion air valve 32 is in its closed position blocking flow of combustion air to the first combustion air filter 26; the second combustion air valve 34 is in its opened position allowing flow of combustion air to the first side 68 of the second combustion air filter 28 for filtering of combustion air by the second combustion air filter 28; the first compressed air valve 60 is in its opened position allowing flow of compressed air to the second side 70 of the first combustion air filter 26 for cleaning of the first combustion air filter 26; and the second compressed air valve 62 is in its closed position blocking flow of compressed air to the second combustion air filter 28.

The actuation system 40 is operatively coupled to the combustion air valves 32, 34 and the compressed air valves 60, 62 to move them between the first mode of operation and the second mode of operation. As such, the actuation system 40 moves the first combustion air valve 32 and the second compressed air valve 62 between opened and closed positions together and the second combustion air valve 34 and the first compressed air valve 60 between opened and closed positions together in a manner opposite to the first combustion air valve 32 and the second compressed air valve 62.

The actuation system 40 may include, for example, a single actuator 41 having a motor 42 and a shaft 43 driven by the motor 42 and operatively coupled to the first combustion air valve 32 and the second combustion air valve 34. If the valves 32, 34 are butterfly valves (shown diagramatically in FIGS. 1 and 3), the valves 32, 34 may be mounted on the shaft 43 such that the shaft 43 extends coaxially through the valves 32, 34. Rotation of the shaft 43 in opposite directions rotates the valves 32, 34 between their corresponding opened and closed positions. The motor 42 may be an electric motor, or other suitable motor to rotate the shaft 42. A single actuator 41 with a shaft 43 extending through the valves 32, 34 provides an efficient and effective way of actuating the valves 32, 34.

The shaft 43 of the single actuator 41 may be coupled to the combustion air valve 32, 34 and the compressed air valves 60, 62. If the valves 32, 34, 60, 62 are butterfly valves (shown diagrammatically in FIG. 1), the valves 32, 34, 60, 62 may be mounted on the shaft 43 such that the shaft 43 extends coaxially through the valves 32, 34, 60, 62. Rotation of the shaft 43 in opposite directions rotates the valves 32, 34, 60, 62 between their corresponding opened and closed positions. A single actuator 41 with a shaft 43 extending through the valves 32, 34, 60, 62 provides an efficient and effective way of actuating the valves 32, 34, 60, 62.

It is to be appreciated that other actuation systems may be employed to actuate the valves 32, 34, 60, 62. In some embodiments, there may be a complex linkage for actuating the valves 32, 34, 60, 62 in a single stroke. In some embodiments, the axis of rotation of one or more of the valves 32, 34, 60, 62 may be transverse to the axis of rotation of the shaft 43, in which case rotation of the shaft 43 may be transmitted to the respective valve 32, 34, 60, 62 via a bevel gear arrangement including, for example, a bevel gear on the shaft 43 and a mating bevel gear on the shaft of the respective valve 32, 34, 60, 62. In some embodiments, there may be more than one actuator. For example, there may be four actuators, one for each valve 32, 34, 60, 62, or some actuators may actuate more than one of the valves 32, 34, 60, 62, but less than all of them. The valves 32, 34, 60, 62 may be actuated in a wide variety of ways.

Figure 2:
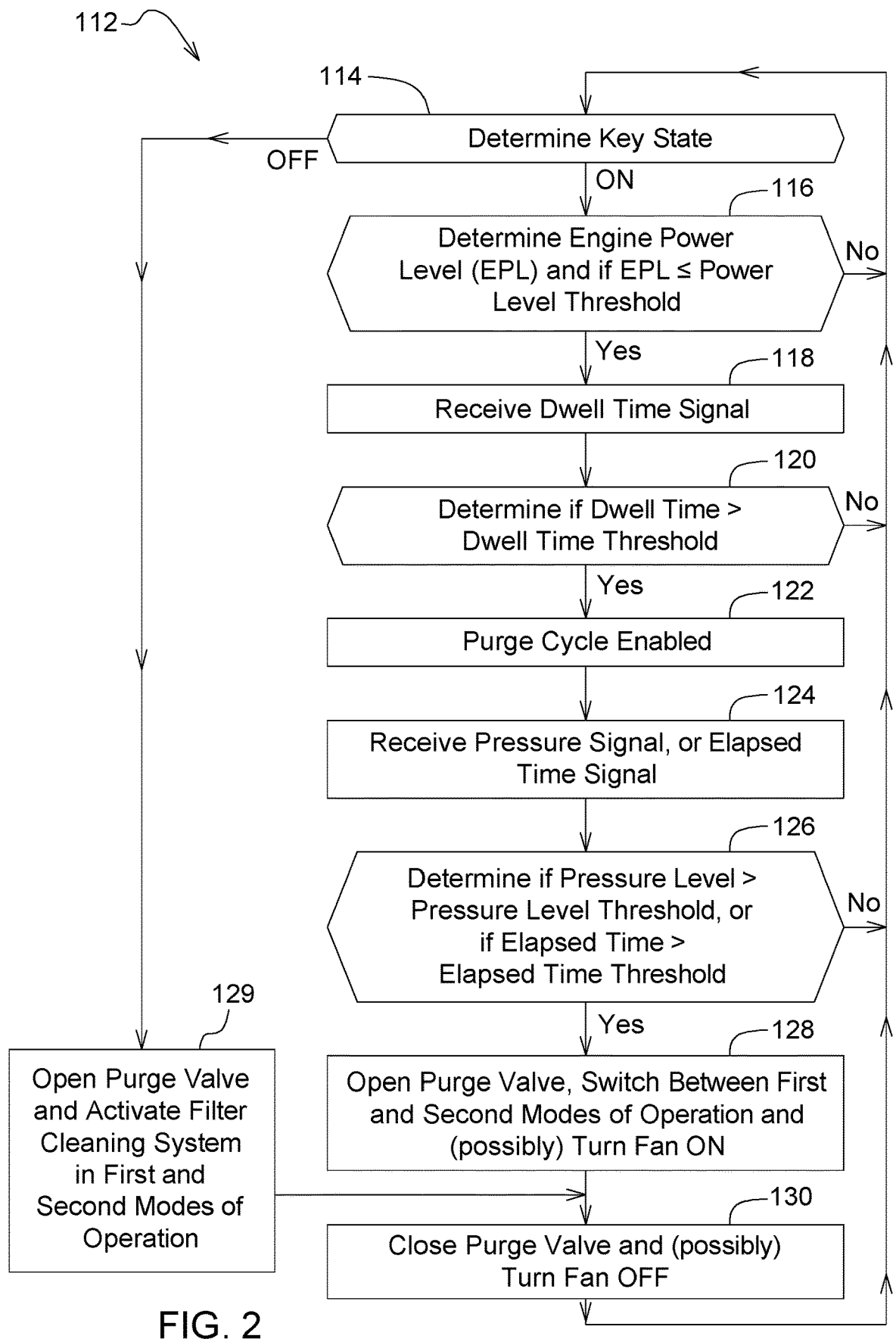
FIG. 2 is a flowchart showing a control scheme for operating the combustion air filtration apparatus.

Referring to FIGS. 1 and 2, the filtration apparatus 16 includes a control system 110 to control the filtration apparatus 16. The control system 110 executes a control scheme 112 to do so.

The filter system 20 and the filter cleaning system 44 are under the control of the control system 110. The first flow control system 30 and its combustion air valves 32, 34 are under the control of the control system 110. The second flow control system 46 and its compressed air valves 60, 62, the purge valve 52, and the fan 74 are under the control of the control system 110.

The control system 110 includes one or more controllers. Each controller includes a processor and memory including instructions stored therein such that, when executed by the processor, cause the processor to perform respective operations of the control scheme 112. In some embodiments, a single controller of the control system 112 carries out the control scheme 112, such as the engine control unit (ECU)

of the machine 10. In some embodiments, more than one controller is involved to carry out the control scheme 112. It is to be appreciated that any suitable number of controllers may be involved, and, as such, the control system 110 is simply referred to as the control system herein without reference to any specific controller.

At block 114 of the control scheme 112, the control system 110 determines the key state of the machine 10. The key state represents the operational status of the engine 14. If the key state is ON, the engine 14 is running, or is at least enabled to run, and the control scheme 112 advances to block 116. If the key state is OFF, the engine 14 is shutdown, and disabled from running, and the control scheme advances to block 129.

The control system 110 can command a filter cleaning event when the engine 14 is running if the load on the engine is not too high. At block 116, the control system 110 determines the engine power level (EPL), indicative of the load on the engine 14. The control system 110 (e.g., the ECU) knows the EPL given, for example, the fuel injection rate, engine speed, and air consumption rate. The control system 110 determines if the EPL is less than or equal to a predetermined power level threshold, which may occur, for example, when the machine 10 is traveling downhill, stopping, idling, in a light crop, etc. If the EPL is less than or equal to the predetermined power level threshold, the control scheme 112 advances to block 118. If not, the control scheme 112 advances back to block 114. The predetermined power level threshold may be any suitable power level threshold. In some embodiments, the predetermined power level threshold may represent a 50% load on the engine 14.

The control system 110 may have a timer 90 to verify that the EPL, indicative of the engine load, is at or below the predetermined power level threshold long enough to ensure that the engine load drop-off is not merely a momentary transient. At block 118, the control system 110 receives a dwell time signal indicative of a dwell time of the engine 14 at or below the predetermined power level threshold.

At block 120, the control system 110 determines if the dwell time greater than a predetermined dwell time threshold (e.g., several seconds). If so, a purge cycle is enabled at block 122, and the control scheme 112 advances to block 124. If not, the control scheme 112 advances back to block 114.

A purge cycle may be triggered by partial filter clogging, indicated by pressure build-up, or assumed partial filter clogging, indicated by elapsed time of operation since the last purge. The control scheme 112 may operate on the basis of either or both purge-triggering events. Pressure is considered first, then elapsed time.

Considering pressure, the control system 110 may be electrically coupled to a single pressure sensor 92 of the supply circuit 12. The pressure sensor 92 is positioned downstream of the downstream node 39 and upstream of the engine 14 to determine the extent of clogging of the filters 26, 28. The pressure sensor 92 may be positioned near the inlet of the turbocharger 22 when the supply circuit 12 has a turbocharger 22. As clogging of a given filter 26, 28 increases, the vacuum pressure sensed by the pressure sensor 92 increases. In some embodiments of the supply circuit 12, pressure drop across the filters 26, 28 may be sensed using at least two pressure sensors. In an example, there may be one pressure sensor upstream of the upstream node 38 and one pressure sensor downstream of the downstream node 39, for a total of two pressure sensors. In another example, there may be two pressure sensors for each filter 26, 28, one upstream of the respective filter 26, 28 and one downstream of the respective filter 26, 28, for a total of four pressure sensors. In another example, the two upstream pressure sensors may be reduced to one upstream pressure sensor upstream of the upstream node 38, for a total of three pressure sensors. In another example, the two downstream pressure sensors may be reduced to one downstream pressure sensor downstream of the downstream node 39, for a total of three pressure sensors. The control scheme 112 is discussed further in connection with a single pressure sensor 92.

In the case of sensing filter clogging via pressure, in block 124, the control system 110 receives from the pressure sensor 92 a vacuum pressure signal indicative of a vacuum pressure level. In block 126, the control system 110 determines if the sensed vacuum pressure level is greater than a predetermined vacuum pressure level threshold. In an example, the predetermined vacuum pressure level threshold is indicative of 50% of the fully clogged level of the respective filter 26, 28. If so, the control scheme 112 advances to block 128. If not, the control scheme 112 advances back to block 114.

In the case of sensing elapsed time, in block 124, the control system 110 receives from a timer 94 an elapsed time signal indicative of the elapsed time of operation since the last purge cycle for the respective filter 26, 28. The control system 110 will continue to receive the elapsed time signal regardless whether a purge cycle has been enabled or not, in order to keep track of the elapsed time of operation since the last purge cycle. In block 126, the control system 110 determines if the elapsed time of operation is greater than a predetermined elapsed time threshold. If so, the control scheme 112 advances to block 128. If not, the control scheme 112 advances back to block 114. In some embodiments, in block 126, the control system 110 determines if the sensed vacuum pressure level is greater than a predetermined vacuum pressure level threshold, and if the elapsed time of operation is greater than a predetermined elapsed time threshold. If either condition is met, the control scheme 112 advances to block 128

In block 128, the control system 110 outputs control signals to effect cleaning of the at least partially clogged filter 26, 28. The control system 110 outputs a control signal to the purge valve 52 to open the purge valve 52, allowing the flow of compressed air into the second flow-parallel arrangement 76. The control system 110 outputs a control signal to the actuation system 40 commanding the actuation system 40 to switch the combustion air valves 32, 34 and the compressed air valves 60, 62 from the current mode of operation of the first and second modes of operation to the other mode of operation of the first and second modes of operation. As indicated herein, the vacuum fan 74 may run with the engine 14 continuously, or be turned ON and OFF intermittently by a fan actuator 75 (e.g., electric motor) (hence, the term "possibly" in FIG. 2). In the case of intermittent operation, the control system 110 outputs a control signal to the fan actuator 75 to turn the vacuum fan 74 ON. In either case, debris is thereby removed from the filter 26, 28 in focus for purging. Since the fan 74 is also in communication with the other filter 26, 28, which is active, some debris may also be removed from that filter 26, 28 and upstream therefrom. It is further noted that, in the case of continuous fan operation, the fan 74 may tend to continuously remove debris from both filters 26, 28 during operation of the engine 14, regardless whether a purge cycle has been initiated. Such removal is further abetted by use of compressed gas in a purge cycle. The next purge cycle during operation of the engine 14 would target cleaning of the other filter 26, 28.

In block 130, when the key-ON purge cycle is completed (e.g., after a predetermined elapsed period of time), the control system 110 commands the purge valve 52 to close. In the case where the purge valve 52 is a solenoid purge valve, the purge valve 52 may be spring-biased to a closed position such that it closes automatically under spring force upon removal of the control signal from the control system 110. In addition, in the case of intermittent fan operation, the control system 110 commands the fan actuator 75 to turn the fan 74 OFF (hence, the term "possibly" in FIG. 2). The control scheme 112 is advanced back to the block 114.

If the key state is OFF, the control scheme 112 advances to block 129. In block 129, the control system 110 outputs control signals to effect cleaning of both filters 26, 28, even if the clogging level of one or both filters 26, 28 is less than the clogging threshold (e.g., 50%). The control system 110 outputs a control signal to the purge valve 52 to open the purge valve 52, allowing the flow of compressed air into the second flow-parallel arrangement 76. If the vacuum fan 74 is driven by the engine 14, the control system 110 commands the engine 14 to keep running so as to delay engine shutdown at key OFF in order to drive the fan 74 for the purge cycle. If the vacuum fan 74 is operated by a fan actuator 75 (e.g., electric motor) under the control of the control system 110, the control system 110 outputs a control signal to the fan actuator 75 to turn the vacuum fan 74 ON (if the fan actuator 75 needs the engine 14 to run in order to operate, the control system 110 could command the engine 14 to keep running so as to delay engine shutdown at key OFF in order to operate the fan actuator 75 for the purge cycle). The control system 110 outputs a control signal to the actuation system 40 commanding the actuation system 40 to switch the combustion air valves 32, 34 and the compressed air valves 60, 62 between the first and second modes of operation so as to operate the filter cleaning system 44 in both modes of operation to clean the filters 26, 28 one after the other.

In block 130, when the key-OFF purge cycle is completed (e.g., after a predetermined elapsed period of time in each mode of operation), the control system 110 commands the purge valve 52 to close. In addition, depending on how the fan 74 is operated, the control system 110 commands the engine 14 to shut down and thereby turn the fan 74 OFF. In the case of intermittent fan operation, the control system 110 commands the fan actuator 75 to turn the fan 74 OFF (or, if engine operation was needed to operate the fan actuator 75, the control system 110 commands the engine 14 to shut down and thereby turn the fan actuator 75 and fan 74 OFF). The control scheme 112 is advanced back to the block 114.

Figure 3:
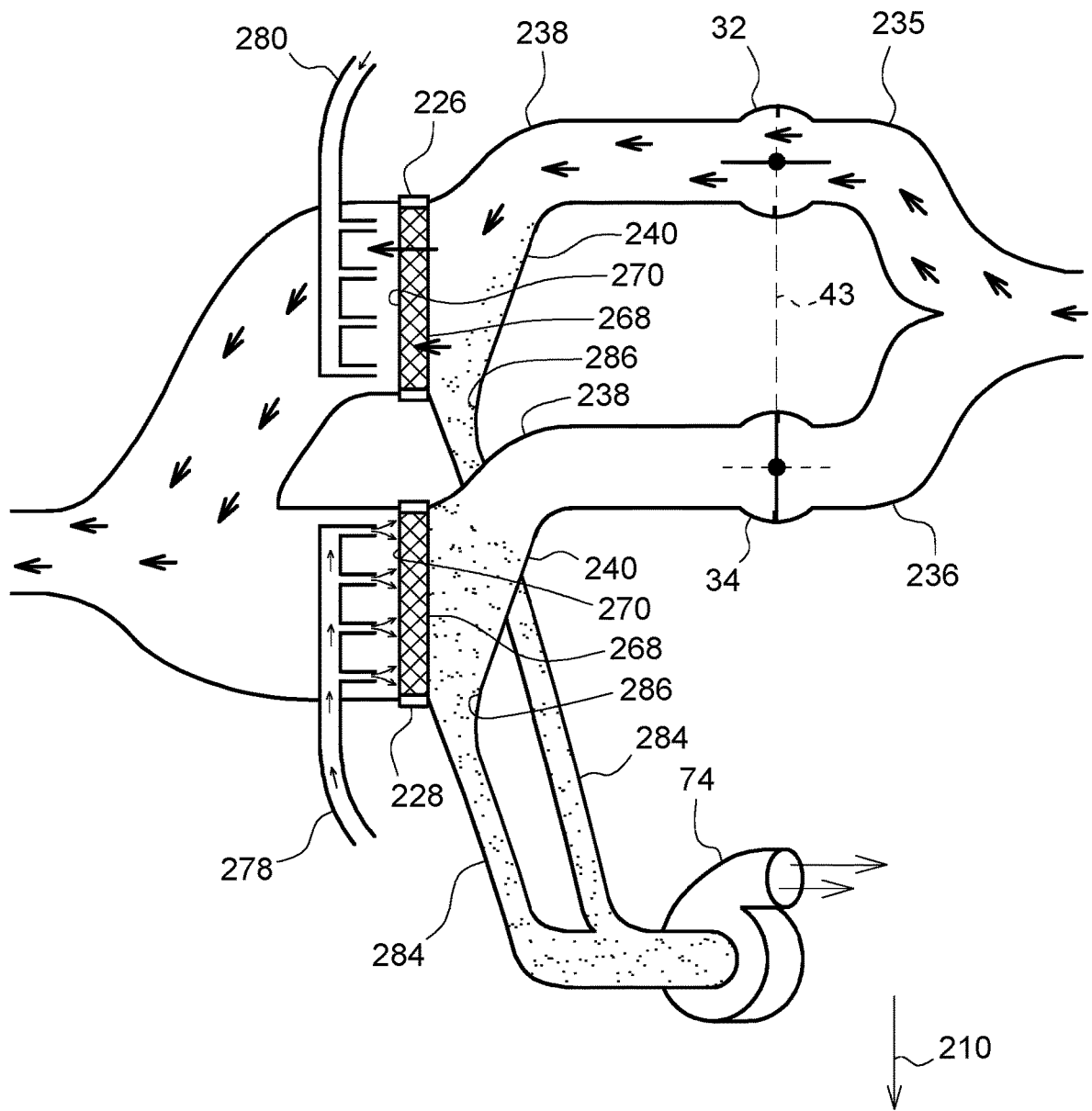
FIG. 3 is a partially diagrammatic, elevational view showing a first combustion air filter filtering combustion air and a second combustion air filter being cleaned of debris collected thereby.

Referring to FIG. 3, an embodiment of the filtration apparatus 16 is assisted by gravity and inertial particle separation to promote combustion air filtration. The direction of gravity is downward in FIG. 3 as represented by the arrow 210.

The filters 26, 28 are embodied respectively as rectangularly-shaped filters 226, 228. Each filter 226, 228 has a pleated filter element providing first and second faces 268, 270 embodying respectively the first and second sides 68, 70.

The first and second branches 35, 36 of the first flow-parallel arrangement 37 are embodied respectively as first and second branches 235, 236. Each branch 235, 236 has a bend 238 that turns into a generally vertical passageway 240 in front of the respective filter 226, 228.

The first and second branches 78, 80 of the second flow-parallel arrangement 76 are embodied respectively as first and second branches 278, 280. Each branch 278, 280 has a downstream passageway 284 fluidly coupled to and extending downwardly from the respective generally vertical passageway 240 near the bottom thereof at an opening 286, so that heavier debris entrained in the flow of combustion air in the generally vertical passageway 240 may tend to continue downwardly under the influence of its own inertia and gravity and pass through the opening 286 into the downstream passageway 284. Lighter debris may make the fairly sharp turn into the filter 226, 228 with the flow of combustion air whereupon the lighter debris may then be trapped by the filter 226, 228.

In some embodiments with rectangularly-shaped filters 226, 228, the filters 226, 228 may be oriented in a generally horizontal manner. In such a case, flow of combustion air may be upward, and flow of compressed air may be downward so that gravity assists in removal of debris.

Figures 4, 5:
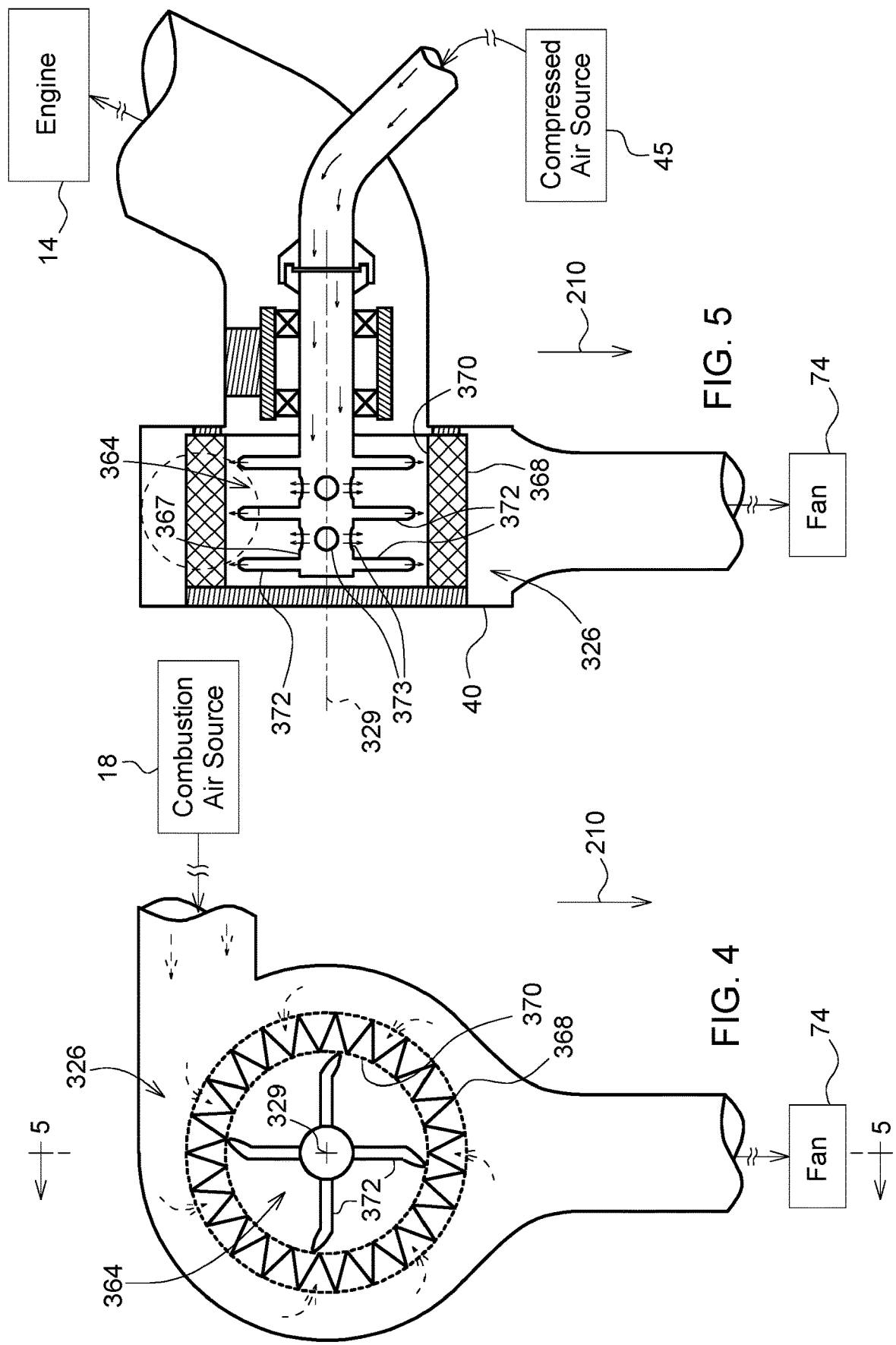
FIG. 4 is a partially diagrammatic, elevational view showing a cylindrical combustion air filter embodiment oriented with a horizontal axis, and a rotatable dispenser of compressed air within the cylindrical combustion air filter.
FIG. 5 is a sectional view taken along lines 5-5 of FIG. 4.

Referring to FIGS. 4 and 5, each filter 26, 28 may be embodied as a cylindrical filter 326, and each dispenser 64, 66 may be embodied as a dispenser 364.

The filter 326 is configured, for example, as a pleated cylindrical filter, with a horizontal axis 329. Combustion air flows from an external first side 368 of the filter 326 to an internal second side 370 of the filter 326.

The dispenser 364 is positioned in the interior of the filter 326. The dispenser has radial nozzles 372 angled at the tips to impart rotation to the dispenser 364 upon discharge of compressed air therefrom in order to spray the internal second side 370 of the filter 326 with compressed air to dislodge debris from the filter 364 as compressed air passes from the internal second side 370 to the external first side 368. The dispenser 364 may also include other outlet openings 373 in the manifold 367 of the dispenser 364.

Referring to FIG. 6, the filter 326 and plumbing are rearranged so that the axis 329 of the filter 326 is vertical. Such an arrangement facilitates flow of debris from the filter 326 downwardly with gravity for discharge by the fan 74.

The filters 26, 28 may be configured in a wide variety of ways. In some embodiments, each filter 26, 28 may have a pleated cylindrical filter element with a nozzle manifold cage positioned within the cylindrical filter element and having a cylindrical cage shape. The nozzle manifold cage is mounted to an air bearing, such that the nozzle manifold cage can rotate freely due to jets of air from a multitude of nozzles included in the nozzle manifold cage, creating thrust sufficient to cause the nozzle manifold cage to rotate. Such an arrangement would effectively spray most if not all of the internal surface of the filter element and remove debris therefrom.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A combustion air filtration apparatus for filtering combustion air for an engine, the combustion air filtration apparatus comprising:
   a combustion air source,
   a filter system fluidly coupled to the combustion air source and to the engine to receive combustion air from the combustion air source and to supply filtered combustion air for the engine, the filter system comprising a first combustion air filter, a second combustion air filter flow-parallel to the first combustion air filter, and a flow control system fluidly coupled to the first combustion air filter and the second combustion air filter to direct flow of combustion air selectively between the first combustion air filter and the second combustion air filter, and a filter cleaning system fluidly coupled to the filter system to clean the first combustion air filter and the second combustion air filter selectively, wherein the filter cleaning system comprises a compressed air source and a second flow control system positioned fluidly between the compressed air source and the first and second combustion air filters to direct flow of compressed air supplied by the compressed air source selectively between the first combustion air filter and the second combustion air filter, the second flow control system comprises a first compressed air valve fluidly coupled to the first combustion air filter and a second compressed air valve flow-parallel to the first compressed air valve and fluidly coupled to the second combustion air filter, the flow control system comprises a first combustion air valve fluidly coupled to the first combustion air filter and a second combustion air valve fluidly coupled to the second combustion air filter, each of the first combustion air filter and the second combustion air filter comprises a first side and a second side opposite to the first side, the first combustion air valve is fluidly coupled to the first side of the first combustion air filter, the first compressed air valve is fluidly coupled to the second side of the first combustion air filter, the second combustion air valve is fluidly coupled to the first side of the second combustion air filter, and the second compressed air valve is fluidly coupled to the second side of the second combustion air valve, such that, with respect to each of the first combustion air filter and the second combustion air filter, combustion air flows from the first side to the second side and compressed air flows from the second side to the first side.

2. The combustion air filtration apparatus of claim 1, wherein the second combustion air valve flow-parallel to the first combustion air valve.

3. The combustion air filtration apparatus of claim 2, wherein the filter system comprises a first branch and a second branch flow-parallel to the first branch, the first branch comprises the first combustion air filter and the first combustion air valve, and the second branch comprises the second combustion air filter and the second combustion air valve.

4. The combustion air filtration apparatus of claim 2, comprising an actuation system operatively coupled to the first combustion air valve and the second combustion air valve to move the first combustion air valve between opened and closed positions and the second combustion air valve between opened and closed positions in a manner opposite to the first combustion air valve.

5. The combustion air filtration apparatus of claim 1, comprising an actuation system operatively coupled to the first and second combustion air valves and the first and second compressed air valves to move the first combustion air valve and the second compressed air valve between opened and closed positions together and the second combustion air valve and the first compressed air valve between opened and closed positions together in a manner opposite to the first combustion air valve and the second compressed air valve.

6. The combustion air filtration apparatus of claim 1, comprising an actuation system operatively coupled to the first compressed air valve and the second compressed air valve to move the first compressed air valve between opened and closed positions and the second compressed air valve between opened and closed positions in a manner opposite to the first compressed air valve.

7. The combustion air filtration apparatus of claim 1, wherein the filter cleaning system comprises a fan fluidly coupled to the first side of the first combustion air filter and the first side of the second combustion air filter to remove debris released from the first and second combustion air filters due to application of compressed air by the filter cleaning system.

8. The combustion air filtration apparatus of claim 1, wherein the filter system comprises a first branch and a second branch flow-parallel to the first branch of the filter system, the first branch of the filter system comprises the first combustion air filter and the first combustion air valve, the second branch of the filter system comprises the second combustion air filter and the second combustion air valve, the filter cleaning system comprises a first branch and a second branch flow-parallel to the first branch of the filter cleaning system, the first branch of the filter cleaning system comprises the first compressed air valve, and the second branch of the filter cleaning system comprises the second compressed air valve.

9. The combustion air filtration apparatus of claim 1, wherein the filter cleaning system comprises a first branch and a second branch flow-parallel to the first branch, the first branch comprises the first compressed air valve, and the second branch comprises the second compressed air valve.

10. The combustion air filtration apparatus of claim 1, wherein the compressed air source comprises an air inlet fluidly coupled to a point downstream of the first combustion air filter and the second combustion air filter.

11. The combustion air filtration apparatus of claim 1, wherein the filter cleaning system comprises a fan fluidly coupled to the first combustion air filter and the second combustion air filter to remove debris released from the first and second combustion air filters due to application of compressed air by the filter cleaning system.

12. The combustion air filtration apparatus of claim 1, comprising a control system, wherein the flow control system is under the control of the control system.

13. The combustion air filtration apparatus of claim 12, wherein the flow control system comprises a first combustion air valve fluidly coupled to the first combustion air filter and a second combustion air valve flow-parallel to the first combustion air valve and fluidly coupled to the second combustion air filter, and the first combustion air valve and the second combustion air valve are under the control of the control system.

14. The combustion air filtration apparatus of claim 12, wherein the filter cleaning system is under the control of the control system.

15. The combustion air filtration apparatus of claim 14, wherein the first compressed air valve and the second compressed air valve are under the control of the control system.

* * * * *